United States Patent

[11] 3,582,732

[72] Inventor Joseph F. Kovalsky
  Buffalo, N.Y.
[21] Appl. No. 877,126
[22] Filed Nov. 17, 1969
[45] Patented June 1, 1971
[73] Assignee Trico Products Corporation
  Buffalo, N.Y.

[54] COORDINATED WINDSHIELD WASHER AND WIPER
  13 Claims, 2 Drawing Figs.
[52] U.S. Cl. .................................................. 318/102,
  307/141, 15/250.17
[51] Int. Cl. .................................................. H03k 17/62
[50] Field of Search .................................... 318/101,
  102, 103, 112, 484; 307/141, 141.4

[56] References Cited
UNITED STATES PATENTS
3,457,433 7/1969 Watson .................... 307/141
3,457,464 7/1969 Wallentowitz ............. 307/141X Primary Examiner—Oris L. Rader
Assistant Examiner—W. E. Duncanson, Jr.
Attorney—E. Herbert Liss ABSTRACT: A control system for energizing a windshield washer pump and a windshield wiper motor simultaneously for conjoint operation and for sequentially discontinuing, first, operation of the washer pump and then operation of the washer motor includes a pair of silicon controlled rectifiers each in circuit with the washer pump and wiper motor respectively; a second silicon controlled rectifier is connected in a bypassing and extinguishing network in the circuit with each of the first mentioned silicon controlled rectifiers through a capacitor whereby triggering of each of the second pair of silicon controlled rectifiers extinguishes a corresponding one of the first pair of controlled rectifiers. In response to energizing the control system a first timing network is energized and after a time interval it transmits a voltage impulse to trigger the first one of the second pair of controlled rectifiers. Triggering of the first one of the second pair of controlled rectifiers initiates the start of a second timing circuit which, after a duration of time, triggers the second one of the controlled rectifiers in the extinguishing network to deenergize the wiper motor. The timing networks are each switched by a unijunction transistor to start the timing period.

PATENTED JUN 1 1971

3,582,732

INVENTOR.
JOSEPH F. KOVALSKY.
BY
E. Herbert Liss
ATTORNEY.

3,582,732

COORDINATED WINDSHIELD WASHER AND WIPER

BACKGROUND OF THE INVENTION

The invention relates to a control system for windshield cleaning apparatus and more particularly to a control system for providing conjoint windshield wiper and washer operation followed by termination of washer action, then by dry wipe cycles of windshield wipers and then by termination of wiper action.

Coordinated windshield cleaning systems are known in the prior art which include cumbersome timing mechanisms with cams, gears and linkages as, for example, those shown in U.S. Pat. No. 2,743,473 and Re. 24,697. In these systems the washers and wipers are timed independently so that if the washing time is overextended there will be too few dry wipe strokes of the wiper since both start their timed cycle simultaneously. There are also semicoordinated systems which provide conjoint windshield wiping and washing operation but require an operator controlled switch to be utilized for turning the wipers off at the end of the dry wipe cycles. These systems, too, are cumbersome ratchet, gear and cam operated systems as, for example, the system illustrated in U.S. Pat. No. 2,965,913. Such systems as this require substantial alteration of the windshield wiper gear box and restrict the pump to a location adjacent the wiper motor gear box.

The novel control system of the present invention overcomes these objections by providing a compact, reliable system utilizing solid state electronic components for providing fully coordinated windshield cleaning. The entire system may be included as a component of the dash mounted or floorboard mounted manual controller for the windshield wiping system.

SUMMARY OF THE INVENTION

The invention comprises a solid state, electronic control system utilizing gate-controlled semiconductor devices in circuit with first and second electric loads. The loads may comprise a washer pump and a wiper motor respectively, and an electronic timing circuit for controlling the time duration of current flow through each of the solid state switching devices. The timing networks operate in sequence and include solid state switching devices.

The primary object of the present invention is to provide a compact, reliable control system for providing conjoint energization of first and second electrical loads followed by sequential deenergization of the loads.

Another object of the invention is to provide a compact, reliable coordinated windshield cleaning system for effecting conjoint operation of the windshield washer pump and wiper followed by a sequential halting first of the washer operation and then of the wiper operation wherein the timing of the wiper begins only after discontinuance of the washing cycle.

A still further object of the invention is to provide a compact, reliable, self-contained control system for a coordinated windshield cleaning system in which the wiper can be operated independently of the system and wherein a timed washing cycle can be superimposed on the wiper system when the wiper system is independently energized.

A further object of the invention is to provide a compact, reliable, coordinated control system for a windshield cleaning system in which the control system comprises a substantially self-contained unit independent of the motors requiring only the usual electrical leads necessary for connecting the motor to a manual control.

Other objects and advantages of the invention will be apparent from the following detailed description taken in connection with the accompanying drawings.

DESCRIPTION OF THE PREFERRED EMBODIMENT

Figure 1:
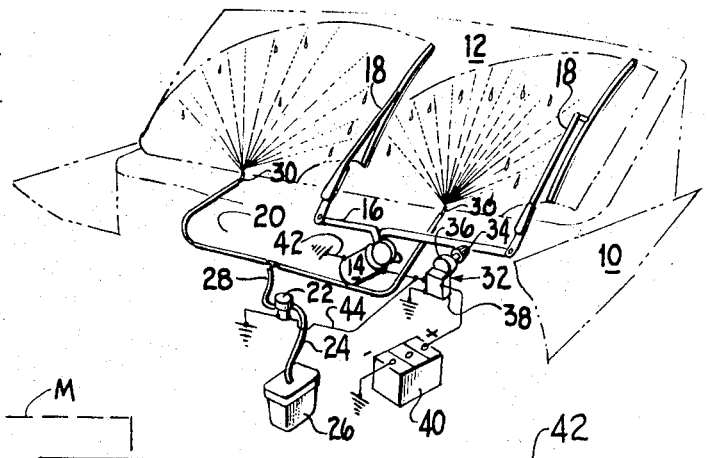
FIG. 1 is a fragmentary perspective view of an automotive vehicle incorporating the coordinated control system of the present invention.

In FIG. 1 a fragmentary view of an automotive vehicle 10 includes a windshield 12 and windshield wiping apparatus comprising a wiper motor 14, windshield wiper linkage 16 for driving a pair of windshield washer pivot shafts (not shown). Mounted on each pivot shaft is a windshield wiper arm and blade set 18 mounted for oscillation with the pivot shaft. The wiper motor 14 may be mounted in any suitable or desirable location as, for example, on the firewall 20 of the vehicle. Also mounted at any convenient or suitable location as, for example, on the firewall 20 is an electrically energized windshield washer pump 22 having an intake hose 24 communicating with a washer solvent reservoir 26, an outlet hose system 28 communicating with discharge nozzles 30 which are mounted adjacent the windshield in a position to project fluid thereon. A manual controller 32 is provided having a stem and knob assembly 34 disposed at a convenient location within the operator compartment, as for example on the dash panel. The manual control assembly 32 includes a contactor assembly 36 and the controller assembly 38 incorporating the control system of this invention. A storage battery 40 is provided as a source of electrical energy. A circuit 42 from ground through the motor 14 and control assembly 38 to the positive terminal of the battery is provided, and a parallel circuit 44 is provided from ground through the washer pump 22 to the control assembly 38.

Figure 2:
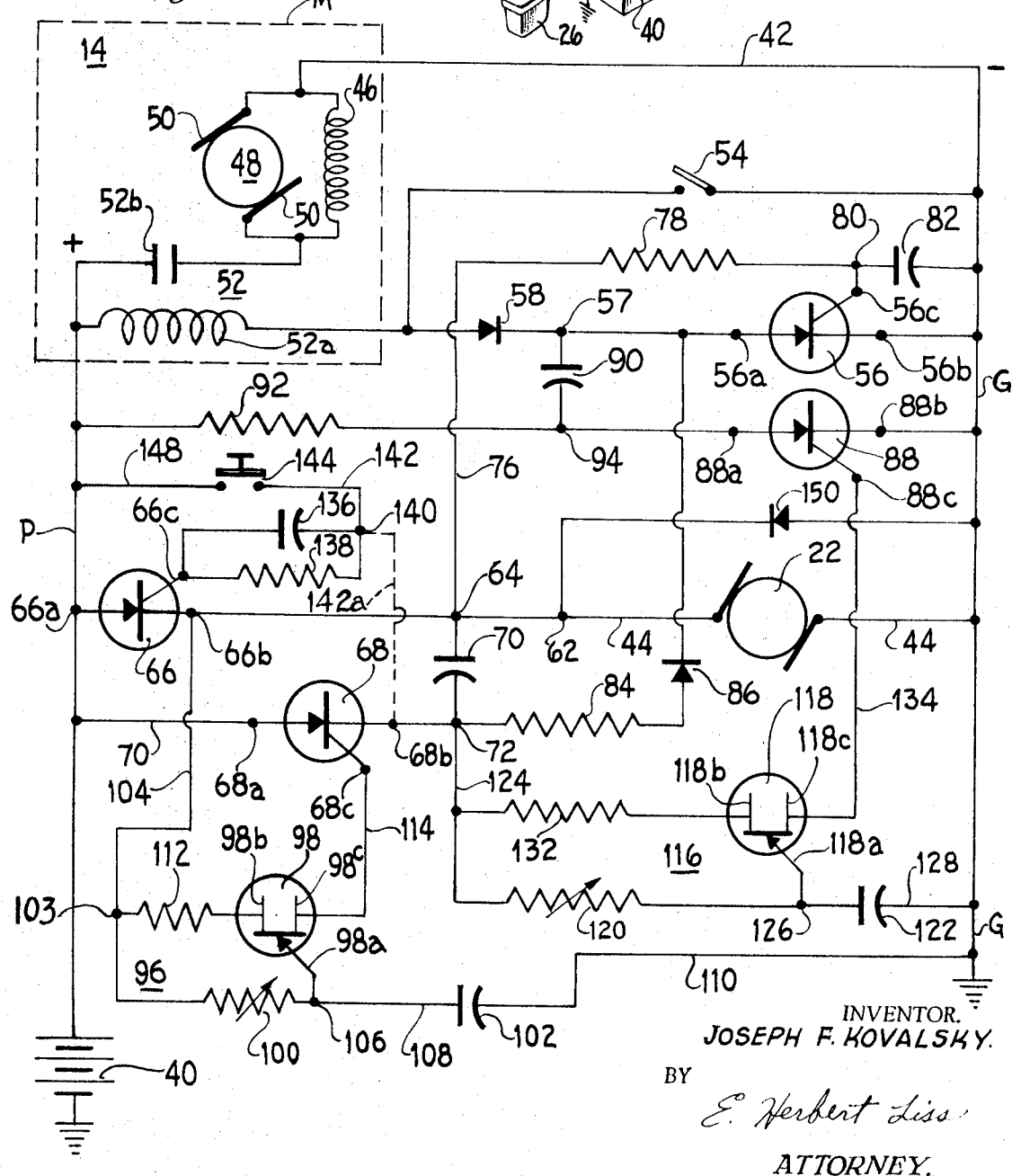
FIG. 2 is a schematic electrical diagram illustrating an embodiment of the present invention.

In FIG. 2 the motor assembly 14 is shown within the dotted lined box M. It includes field coil 46, armature 48, brushes 50, an internal relay 52 having a relay coil 52a and relay contacts 52b. A manual controller 54 is connected in series with the relay coil 52a from a positive bus P connected to the positive terminal of battery 40 to a ground bus G connected with the negative terminal of battery 40. Normally open contacts 52b are closed when the contactor 54 is closed to provide continuous motor operation. Although the manual controller 54 is shown as a single pole, single throw switch, it will of course be understood that a more complex switch may be employed which includes contacts for high and low speed. The circuit of motor 14 may include a shunt and series field with dropping resistors for joint and separate operation to provide high and low speed running. The motor may include an internal switch for parking the wipers in a position off the windshield or at the lower edge thereof. Other and different types of motors may be utilized.

The washer pump motor 22, constituting a first load is connected from ground bus G through circuit 44 and junctions 62 and 64 to cathode terminal 66b of a silicon controlled rectifier (SCR) 66. SCR 66 constituting a master or first load switch includes in addition to cathode terminal 66b, an anode terminal 66a and a gate terminal 66c. Anode terminal 66a of SCR 66 is connected to positive bus P of the electrical system. The gate terminal 66c of SCR 66 is connected to a manual starting circuit as will be hereinafter explained in detail. Connected in parallel with the contactor 54 and in series with the relay coil 52a or second load and a diode 58 is the anode-cathode circuit of a silicon controlled rectifier (SCR) 56 constituting a starting switch or second load switch which includes an anode terminal 56a, a cathode terminal 56b and a gate terminal 56c. The cathode terminal 56b of the SCR 56 is connected to the ground bus G. The gate terminal 54c is connected to the anode-cathode circuit of a silicon controlled rectifier (SCR) 68 at junction 80.

SCR 68 and capacitor 70 constitute first circuit interrupting means or extinguishing means for deenergizing SCR 66. SCR 68 includes an anode terminal 68a, a cathode terminal 68b and a gate terminal 68c. The anode-cathode circuit of SCR 68 is connected from positive bus P through a lead 70, anode terminal 68a, cathode terminal 68b to junction 72. Junction 72 is connected through capacitor 70, junction 64, lead 76, limiting resistor 78, junction 80 (also connected to gate 56c of SCR 56) and capacitor 82 to the ground bus G. Junction 72 is also connected through load resistor 84, diode 86, anode terminal 56a of SCR 56 and cathode terminal 56b to ground bus G.

A second circuit interrupting means or extinguishing network for deenergizing SCR 56 comprises a silicon controlled rectifier (SCR) 88 and capacitor 90. SCR 88 includes an anode terminal 88a, a cathode terminal 88b and a gate terminal 88c. The anode-cathode circuit is connected from positive bus P to ground bus G through lead resistor 92, junction 94, anode terminal 88a and cathode terminal 88b of SCR 88 to ground bus G. Capacitor 90 is connected between junction 94 and junction 57 (between anode terminal 56a and diode 58).

A first timing network 96 comprises a unijunction transistor 98 having an emitter electrode 98a and base electrodes 98b and 98c. It also includes a resistor 100, which may be a fixed resistor, a potentiometer, or variable resistor, and a capacitor 102. The resistor 100 at one end is connected to cathode 66b of SCR 66 through junction 103 and a lead 104. At its other end resistor 100 is connected to emitter electrode 98a of unijunction transistor 98 at terminal 106. Capacitor 102 is connected on one side to terminal 106 through a lead 108 and on its other side to ground bus G through a lead 110. The resistor 100 and capacitor 102 constitute the input circuit of the first timing network 96. The base 98b of the unijunction transistor 98 is connected through a limiting resistor 112, junction 103, and lead 104 to cathode terminal 66b of SCR 66. Base 98c of unijunction transistor 98 is connected through a lead 114 to gate terminal 68c of SCR 68. The base circuit 98b, 98c and limiting resistor 112 constitute the output circuit of the first timing network. The second timing network 116 is similar to the first timing network and includes a unijunction transistor 118 having an emitter electrode 118a and base electrodes 118b and 118c. The input circuit comprises a resistor 120 which may be a potentiometer or variable resistor as well as a fixed resistor and a capacitor 122 which is connected to the cathode terminal 68b of SCR 68 through junction 72, lead 124, resistor 120, junction 126, capacitor 122, and lead 128 to ground G. The output circuit of the timing network 116 comprises a limiting resistor 132, base 118b, and base 118c. The output circuit is connected between the cathode terminal 68b of SCR 68 and the gate terminal 88c of SCR 88 through junction 72, lead 124, limiting resistor 132, base electrode 118b, base electrode 118c and lead 134.

The starting network for coordinated conjoint operation of motors 14 and 22 comprises a capacitor 136 and resistor 138 in parallel, connected through junction 140 and lead 142 to a self returning, normally open switch 144 on one side and to gate electrode 66c of SCR 66 at the other side. The switch 144 at its other side is connected to the positive terminal of the battery through lead 148 and positive bus P. The switch 144 may be of any suitable self-reopening type as, for example, a spring biased pushbutton as shown. Momentary closure of switch 144 impresses a momentary positive voltage on gate 66c of SCR 66 by charging the capacitor 136 through the gate to cathode circuit. The employment of a network comprising capacitor 136 and resistance 138 eliminates continuous operation in the event that the operator should maintain the switch 144 closed for an extended period of time. In this event a pulse is provided until the capacitor 136 is fully charged and the resistor 138 provides a discharge path for the capacitor 136. The resistor 138 is of such a value as to prevent triggering of the SCR 66 therethrough.

The starting network described above provides a predetermined time period of washer operation dependent upon the setting of the time period of the first timing network 96. In a modified form of the invention the period of washer operation can be extended by maintaining the manual pushbutton 144 closed beyond the time period of washer operation. Thus if, for example, the windshield has an excessive amount of dirt and foreign material thereon the operator can, by maintaining the pushbutton 144 closed, continue the washer spray on the windshield for a longer period of time. This is accomplished by the addition of lead 142a, shown in dotted line in FIG. 2, connecting the junction 140 and cathode terminal 68b of SCR 68. In this manner a circuit is provided from the positive bus through lead 148, pushbutton 144, lead 142 and lead 142a to bypass the SCR 68 of extinguishing network 68, 70. The washer pump circuit thus remains energized until the pushbutton 144 is released. Following release of pushbutton 144 the remainder of the cycle through the second timing network remains unchanged.

OPERATION

Each of the silicon controlled rectifiers 56, 66, 68 and 88 are gate controlled semiconductor switching devices. When a positive voltage is impressed on the gate terminal the SCR is fired or triggered and the anode-cathode circuit will continue to conduct until the current therethrough is reduced to a critical value either by short circuiting, opening of the circuit or by applying a high resistance in the circuit. Likewise the unijunction transistor base circuit will conduct when voltage at the emitter reaches a predetermined value. It will cease conducting when the voltage at the emitter drops below the predetermined value.

If it is desired to operate only the motor 14 or an equivalent load, switch 54 may be closed to complete a circuit through relay coil 52, thereby closing contacts 52b, to energize the motor 14 or equivalent load; however, if the fully coordinated conjoint operation of motor 14 and motor 22 or equivalent loads is desired, switch 54 is left open and switch 144 is closed momentarily. Closing of switch 144 applies a positive voltage pulse to gate terminal 66c of SCR 66, thereby triggering SCR 66. A circuit is then completed through the anode-cathode circuit of SCR 66, junction 64, lead 76, resistor 78, junction 80 to gate terminal 56c of SCR 56, thereby triggering SCR 56. This completes a circuit through relay coil 52, diode 58, junction 57, and the anode-cathode circuit of SCR 56, thereby energizing motor 14. Simultaneously a circuit is completed through anode-cathode circuit of SCR 66, lead 104, and the input circuit of timing network 96. After a time interval required to charge capacitor 102 to a predetermined voltage, unijunction transistor 98 fires. This time interval is determined by the value of resistor 100. The predetermined voltage required to fire unijunction transistor 98 is determined by the value of resistor 112.

Simultaneously with the above-mentioned operation a circuit is completed through the anode-cathode circuit of SCR 66, junction 62 and motor 22 to ground, thereby energizing the washer pump motor 22 or an equivalent load. Thus wiper motor 14 and washer pump motor 22 are energized substantially simultaneously while timing network 96 is energized. The motors 14 and 22 continue to run until unijunction transistor 98 is fired, at which time a circuit is completed through anode-cathode circuit of SCR 66, lead 104, limiting resistor 112, the base circuit of unijunction transistor 98 and lead 114 to the gate terminal 68c of SCR 68, impressing a positive voltage thereon to thereby trigger SCR 68. The load resistance 84 in the anode-cathode circuit of SCR 68 is of low enough value so that the anode-cathode circuit of SCR 68 continues to conduct through the load resistor 84 and through the anode-cathode circuit of SCR 56 to ground. When SCR 68 fires, a circuit is completed through junction 72, lead 124 to the input circuit of the second timing network 116 which comprises resistor 120 and capacitor 122, thereby effecting firing of unijunction transistor 118 after a delayed time interval depending upon the value of resistor 120. Simultaneously SCR 68 and capacitor 70 provide a momentary short circuit across SCR 66, thereby interrupting current flow therethrough, causing SCR 66 to be extinguished. The interruption of the circuit through the SCR 66 effects deenergization of first motor 22 or an equivalent load. After an interval of time elapses the unijunction transistor 118 fires, completing the circuit through the anode and cathode of SCR 68, junction 72, lead 124, limiting resistance 132, the base circuit of unijunction transistor 118 and lead 134 to the gate terminal 88c of SCR 88, thereby impressing a positive voltage on gate 88c causing the triggering of SCR 88. The circuit through the anode-cathode of SCR 88 is completed through load resistor 92 which is of such a value as to permit short duration conduction through SCR 88 but which will limit the current so as to cause the duration of the current flow therethrough to be self-limiting. SCR 88 and capacitor 90 provide a momentary bypass path across SCR 56 thereby interrupting current flow therethrough. Thus SCR 88 and capacitor 90 become a second extinguishing network or circuit interrupting means for cutting off current flow through SCR 56. When SCR 56 ceases to conduct the second motor 14 or equivalent load is deenergized. The extinguishing of SCR 56 also opens the anode-cathode circuit of SCR 68, thereby interrupting current flow therethrough. Thus the entire control system and both motors 14 and 22 are deenergized at the end of a coordinated cycle.

If the modified circuit employing lead 142a is utilized SCR 68 is short circuited when the switch 144 is closed. Thus SCR 66 continues to conduct and washer pump motor 22 continues to run so long as switch 144 is maintained closed. Although timing network 116 under these conditions produces an output pulse to gate terminal 88c of SCR 88 in the extinguishing network 88, 90 nevertheless SCR 56 continues to conduct because a voltage is continuously impressed on gate terminal 56C of SCR 56, the motor starting switch for motor 14, through SCR 66. Therefore timing of the dry-wipe cycle begins after switch 144 is opened and SCR 66 is extinguished.

If the switch 144 is closed momentarily and reopened before timing network 96 fires the normal timed cycling will occur.

It should now be apparent that closing of the switch 144 energizes the first and second motors 22 and 14 and the first timing network 96 simultaneously. These continue to run until unijunction transistor 98 of the first timing network 96 conducts. Firing of a first timing network 96 triggers the SCR 68 of the first cutoff network 68, 70, deenergizing the SCR 66 and the first motor 22 while at the same time activating the second timing network 116 which, after a time delay, fires SCR 88 of extinguishing network 88, 90, thereby deenergizing SCR 56 which in turn deenergizes the second motor 14 as well as SCR 68. Since the duration of operation of SCR 88 is self-limiting due to the value of the load resistance 92, the entire system becomes deenergized.

It should be noted that when switch 54 is closed to provide continuous operation of motor 14 circuit 42 bypasses SCR 56 thereby preventing its firing. When the control system is in this condition closing of switch 144 will provide a timed cycle of operation of motor 22 while motor 14 is operating without interference with the continuous operation of motor 14.

Capacitor 82 and diode 86 are provided to eliminate transient surges which can occur when switch 54 is closed, thereby preventing erratic operation of the motor 22 when operation is not desired. A diode 150 is provided to eliminate erratic operation resulting from surges when motor 22 is deenergized, and a diode 58 is provided to eliminate erratic operation from surges due to the deenergizing of motor 14.

A unique system has been provided obtaining automatic conjoint operation of a wiper motor and washer pump followed by automatic sequential deenergization first of the washer pump and then of the wiper motor. Wiper-washer operation can be utilized to simultaneously wet and wipe the windshield followed by an assured time period of dry wiping to clear excess moisture from the shield. The timing of each of the motors is independently adjustable; however, the timing of the dry wipe cycle will begin only after the washer stops. This gives a complete dry wipe cycle regardless of the period of time that the washer pump is operating. The system employs reliable solid-state components resulting in a compact and efficient system with no moving parts in the control system.

A certain specific embodiment of the invention has been described for the purpose of illustration but it will be apparent that various modifications and other embodiments are possible within the scope of the invention. For example, in accordance with the broader aspects of the invention, any suitable type of DC motor such as a shunt, a series or a compound wound motor may be employed. This system is compatible with a manual control for a multispeed motor. The control system is disclosed for use with a windshield wiper system but may be employed as well for controlling other electrical loads or motors which drive other mechanisms where the above-described automatic conjoint, coordinated sequential operation is desired. It is to be understood, therefore, that the invention is not limited to the specific arrangement shown but in its broadest aspects it includes all equivalent embodiments and modifications which come within the scope of the invention.

I claim:

1. A control system for a coordinated windshield washer and wiper including an electrically energized washer pump and wiper motor; the combination comprising semiconductor switch means for energizing said wiper motor and washer pump concurrently for conjoint operation, first and second extinguishing means for effecting deenergization of said washer pump and wiper motor, respectively, first timing means responsive to said switch means for effecting energization of said first extinguishing means upon expiration of a timed interval following starting of the motor and pump, and second timing means responsive to said first extinguishing means for effecting energization of said second extinguishing means upon expiration of a timed interval following deenergization of said washer pump.

2. A control system according to claim 1 wherein said first timing means is adjustable.

3. A control system according to claim 1 wherein said second timing means is adjustable.

4. A control system according to claim 1 wherein said first and second timing means are independently adjustable.

5. A control system according to claim 1 including a manual control for controlling energization of said motor independently of said washer pump.

6. A control system according to claim 5 including means for bypassing said second timing means when said motor is energized independently of said washer pump whereby a timed washing cycle can be provided while maintaining continuous operation of said wiper motor.

7. A control system according to claim 1 wherein said first and second cutoff means comprise semiconductor switching devices and wherein said second cutoff means is self-extinguishing.

8. A control system according to claim 1 including manual controller means for sustaining operation of said washer motor beyond the timing period of said first timing means.

9. An electrical control system for energizing first and second loads concurrently and for deenergizing said first and second loads sequentially comprising first and second gate controlled semiconductor load switches triggered by an input pulse to produce a continuous current flow until interrupted, first and second extinguishing networks, each comprising a gate controlled semiconductor switch in circuit with said first and second load switches for interrupting current flow through said first and second load switches, respectively, first and second timing networks being activated in sequence by said first load switch and said first extinguishing network switch, respectively, to produce a delayed output, the output of said first and second timing networks being in circuit with said first and second extinguishing networks, respectively, to thereby trigger said first and second extinguishing networks in sequence.

10. A control system according to claim 9 wherein the timing periods of said first and second timing networks are each independently adjustable.

11. In a system for automatically energizing first and second motors concurrently for an interval followed by sequential deenergization of said motors; a control system comprising first and second timing networks, each network being responsive to an input signal for producing an output signal in an interval of time following reception of the input signal, a gate-controlled, semiconductor starting switch in circuit with said second motor starting circuit for controlling energization thereof, a gate-controlled semiconductor master switch in circuit with said first motor, the gate of said starting switch and said first timing network for controlling energization of said second motor, for triggering said starting motor switch and for supplying an input pulse to said first timing network, first extinguishing means in circuit with said master switch comprising a gate-controlled semiconductor switch for deactivating said master switch, to thereby deenergize said first motor when triggered, said switch of said first extinguishing means having its gate in circuit with and being triggered by the output of said first timing network and being in circuit with the input of said second timing means to thereby apply an input pulse thereto when triggered, second extinguishing means in circuit with said first starting switch comprising a gate-controlled semiconductor switch for extinguishing said first starting switch to thereby deenergize said first motor when said gate-controlled semiconductor extinguishing switch is triggered, said switch of said second extinguishing means having its gate in circuit with and triggered by the output of said second timing network and manually actuated controller means for triggering said master switch.

12. A control system according to claim 1 wherein the timing periods of said first and second timing networks are each independently adjustable.

13. A control system according to claim 11 wherein said manually actuated controller means includes means for sustaining operation of said first motor beyond the timing period of said first timing network by operator actuation.